US009255857B2

(12) United States Patent
Hotta et al.

(10) Patent No.: US 9,255,857 B2
(45) Date of Patent: Feb. 9, 2016

(54) TORQUE DETECTING DEVICE AND ELECTRIC POWER STEERING SYSTEM

(71) Applicant: JTEKT CORPORATION, Osaka-shi, Osaka (JP)

(72) Inventors: Kensaku Hotta, Kashihara (JP); Yusuke Matsui, Shiki-gun (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/341,049

(22) Filed: Jul. 25, 2014

(65) Prior Publication Data
US 2015/0033877 A1  Feb. 5, 2015

(30) Foreign Application Priority Data

Aug. 2, 2013  (JP) ................... 2013-161251

(51) Int. Cl.
*G01L 3/02* (2006.01)
*G01L 3/10* (2006.01)
*B62D 5/04* (2006.01)

(52) U.S. Cl.
CPC .............. *G01L 3/104* (2013.01); *B62D 5/0481* (2013.01)

(58) Field of Classification Search
CPC ... B62D 5/0481; G01D 11/245; G01D 5/145; G01D 1/245; G01L 3/104
USPC .................. 73/862.191, 862.331–862.335
See application file for complete search history.

(56) References Cited

U.S. PATENT DOCUMENTS

| 5,627,464 | A  | * | 5/1997 | Shinjo et al. ............... 324/207.2 |
| 7,387,034 | B2 | * | 6/2008 | Ishihara et al. ........... 73/862.333 |
| 2003/0167857 | A1 | * | 9/2003 | Sugimura et al. ......... 73/862.333 |
| 2008/0028870 | A1 | * | 2/2008 | Tokumoto et al. ........ 73/862.333 |
| 2010/0071481 | A1 |   | 3/2010 | Arita et al. |
| 2011/0005340 | A1 | * | 1/2011 | Jeon et al. ................. 73/862.193 |
| 2013/0192390 | A1 |   | 8/2013 | Shidahara et al. |

FOREIGN PATENT DOCUMENTS

| EP | 2 600 129 A2 | 6/2013 |
| JP | A-2008-249598 | 10/2008 |
| WO | 2011/048846 A1 | 4/2011 |

OTHER PUBLICATIONS

Dec. 23, 2014 Extended Search Report issued in European Application No. 14179356.2.

* cited by examiner

*Primary Examiner* — Max Noori
(74) *Attorney, Agent, or Firm* — Oliff PLC (57) ABSTRACT

A torque detecting device includes a permanent magnet; a first magnetic yoke; a second magnetic yoke; two magnetic elements; a terminal; a case; and an external housing. The two magnetic elements are electrically connected to the terminal. The case accommodates the two magnetic elements and the terminal. The external housing accommodates the permanent magnet, the first magnetic yoke, and the second magnetic yoke, covers an outer side surface of the case, and is formed integrally with the case.

12 Claims, 8 Drawing Sheets

TORQUE DETECTING DEVICE AND ELECTRIC POWER STEERING SYSTEM

INCORPORATION BY REFERENCE

The disclosure of Japanese Patent Application No. 2013-161251 filed on Aug. 2, 2013 including the specification, drawings and abstract, is incorporated herein by reference in its entirety.

BACKGROUND OF THE INVENTION

1. Field of the Invention

The invention relates to a torque detecting device that includes a magnetic element, and an electric power steering system including the torque detecting device.

2. Description of Related Art

A conventional torque detecting device includes a magnetism collecting unit and a sensor unit. The magnetism collecting unit is integrated with a pair of magnetism collecting rings through resin molding. The magnetism collecting unit includes a fitted recessed portion and a flat plate-shaped fitting portion that surrounds the fitted recessed portion. The sensor unit includes a magnetic element. The sensor unit includes the magnetic element, a fitted protruding portion with a cylindrical shape that holds the magnetic element, a flat plate-shaped fitting portion that surrounds the fitted protruding portion, and a seal member that is fitted to the fitted protruding portion. The respective fitting portions of the magnetism collecting unit and the sensor unit are fastened to each other by using a plurality of fixing screws in a state where the fitted protruding portion is inserted into the fitted recessed portion. Thus, the relative positions of the element facing portion of the magnetism collecting ring and the magnetic element are determined. The seal member is disposed between the fitted recessed portion and the fitted protruding portion. The seal member seals a gap between the fitted recessed portion and the fitted protruding portion. Japanese Patent Application Publication No. 2008-249598 (JP 2008-249598 A) shows an example of the configuration of the conventional torque detecting device.

In the conventional torque detecting device, the seal member needs to be provided, for example, between the fitting portion of the sensor unit and the fitting portion of the magnetism collecting unit so that the waterproof performance for the magnetic element is ensured, or the fitting portions need to be fastened by using the plurality of fixing screws so that a gap between the fitting portions is decreased. Accordingly, the number of components may increase, which may increase weight and cost.

SUMMARY OF THE INVENTION

An object of the invention is to provide a torque detecting device in which waterproof performance for a magnetic element is ensured, and whose weight and cost are reduced, and an electric power steering system including the torque detecting device.

A torque detecting device according to an aspect of the invention includes a permanent magnet that is a multi-polar magnet with a cylindrical shape in which magnetic poles are disposed in a circumferential direction; a magnetic yoke that is formed of a magnetic material and is disposed around the permanent magnet at a position in a magnetic field formed by the permanent magnet, and that rotates with respect to the permanent magnet so that a relative phase of the magnetic yoke with respect to the permanent magnet changes; a magnetic element that is disposed around the magnetic yoke, and outputs a signal according to the magnetic field formed by the permanent magnet and magnetic flux of a magnetic circuit including the magnetic yoke; a terminal that is electrically connected to the magnetic element; a case that is disposed around the magnetic yoke, and accommodates the magnetic element and the terminal; and an external housing that is formed of a resin material, accommodates the permanent magnet and the magnetic yoke, covers an outer side surface of the case, and is formed integrally with the case.

With this configuration, the case and the external housing are formed integrally with each other, and thus, the external housing is in close contact with the outer side surface of the case. Therefore, water is unlikely to intrude into the case. Accordingly, water is unlikely to adhere to the magnetic element accommodated in the case. Thus, with the torque detecting device, it is possible to ensure waterproof performance for the magnetic element without using a seal member and a plurality of fixing screws, and to contribute to reduction of the weight and cost.

An electric power steering system according to another aspect of the invention includes the torque detecting device according to the above-mentioned aspect.

In the torque detecting device according to the above-mentioned aspect and the electric power steering system according to the above-mentioned aspect, waterproof performance for the magnetic element is ensured, and the weight and cost thereof are reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
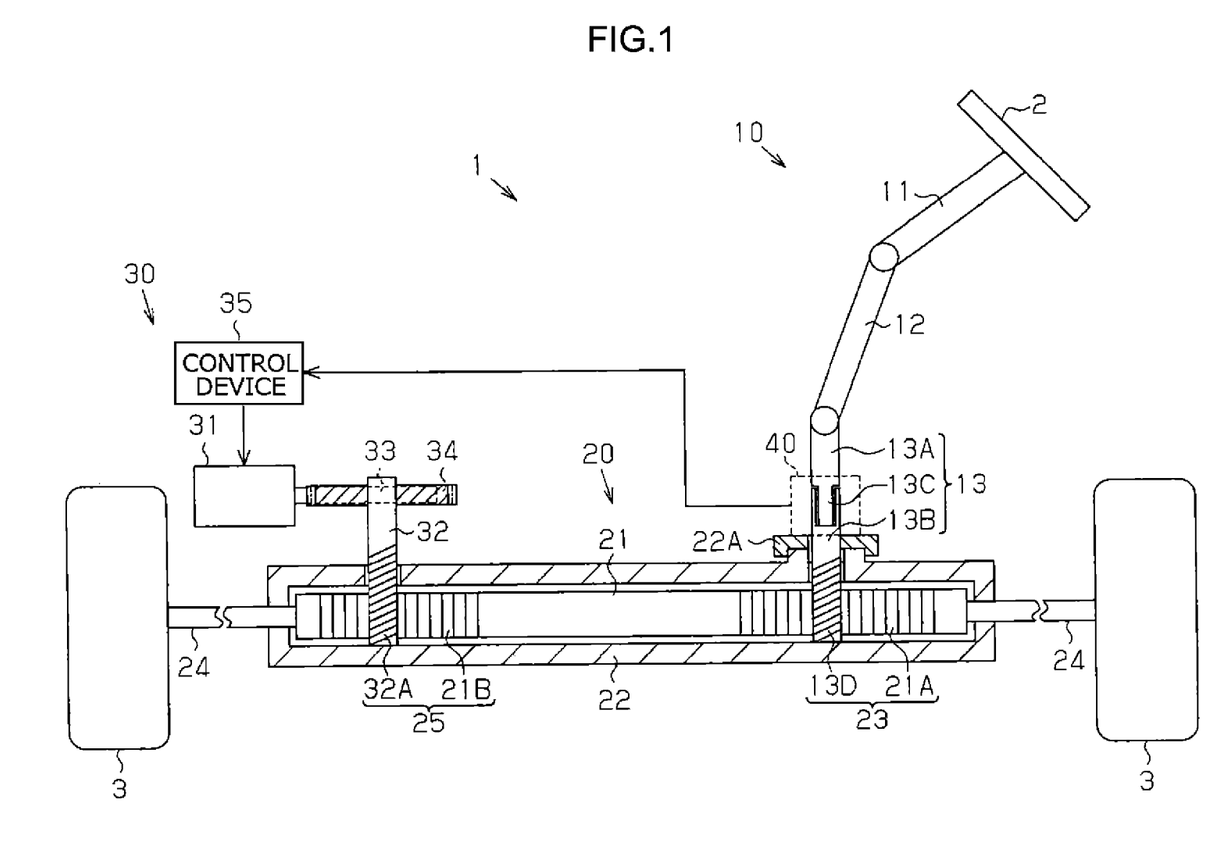
FIG. 1 is a schematic diagram illustrating a configuration of an electric power steering system according to an embodiment.

The configuration of an electric power steering system 1 will be described with reference to FIG. 1. The electric power steering system 1 includes a steering mechanism 10, a steered mechanism 20, an assist mechanism 30, and a torque detecting device 40. The electric power steering system 1 according to the present embodiment is a pinion assist type electric power steering system.

The steering mechanism 10 includes a column shaft 11, an intermediate shaft 12, and a pinion shaft 13. An input side part of the column shaft 11 is connected to a steering member 2. An input side part of the intermediate shaft 12 is connected to an output side part of the column shaft 11.

The pinion shaft 13 includes an input shaft 13A, an output shaft 13B, and a torsion bar 13C. An input side part of the input shaft 13A is connected to an output side part of the intermediate shaft 12. Pinion teeth 13D are formed on the output shaft 13B. A fixing member 13E (refer to FIG. 3) is fitted to an input side part of the output shaft 1313. The torsion bar 13C is twisted according to the difference between the torque of the input shaft 13A and the torque of the output shaft 13B.

The steered mechanism 20 includes a rack shaft 21 and a rack housing 22. First rack teeth 21A and second rack teeth 21B are formed on the rack shaft 21. The first rack teeth 21A and the pinion teeth 13D are engaged with each other. The first rack teeth 21A and the pinion teeth 13D constitute a rack and pinion mechanism 23. The rack housing 22 has a fitting member 22A. The fitting member 22A is fixed at a part of the rack housing 22 where the output shaft 13B is inserted.

In the steered mechanism 20, the rack shaft 21 is linearly moved due to the rotation of the column shaft 11, the intermediate shaft 12, and the pinion shaft 13. Thus, steered wheels 3 are steered via respective tie rods 24.

The assist mechanism 30 includes an assist motor 31, a pinion shaft 32, a worm shaft 33, a worm wheel 34, and a control device 35. The worm shaft 33 is connected to an output shaft of the assist motor 31. The worm wheel 34 is externally fitted to the pinion shaft 32. Pinion teeth 32A are formed on the pinion shaft 32. The second rack teeth 21B and the pinion teeth 32A are engaged with each other. The second rack teeth 21B and the pinion teeth 32A constitute a rack and pinion mechanism 25.

The torque detecting device 40 is fixed to the fitting member 22A. The torque detecting device 40 is disposed around the pinion shaft 13. The torque detecting device 40 outputs a signal according to the amount of torsion of the torsion bar 13C, to the control device 35.

The control device 35 calculates the steering torque that is input into the steering member 2, based on the output signal of the torque detecting device 40. The control device 35 calculates assist torque for assisting a driver's steering operation based on the calculated steering torque. The control device 35 controls the output of the assist motor 31 based on the calculated assist torque.

Figure 2:
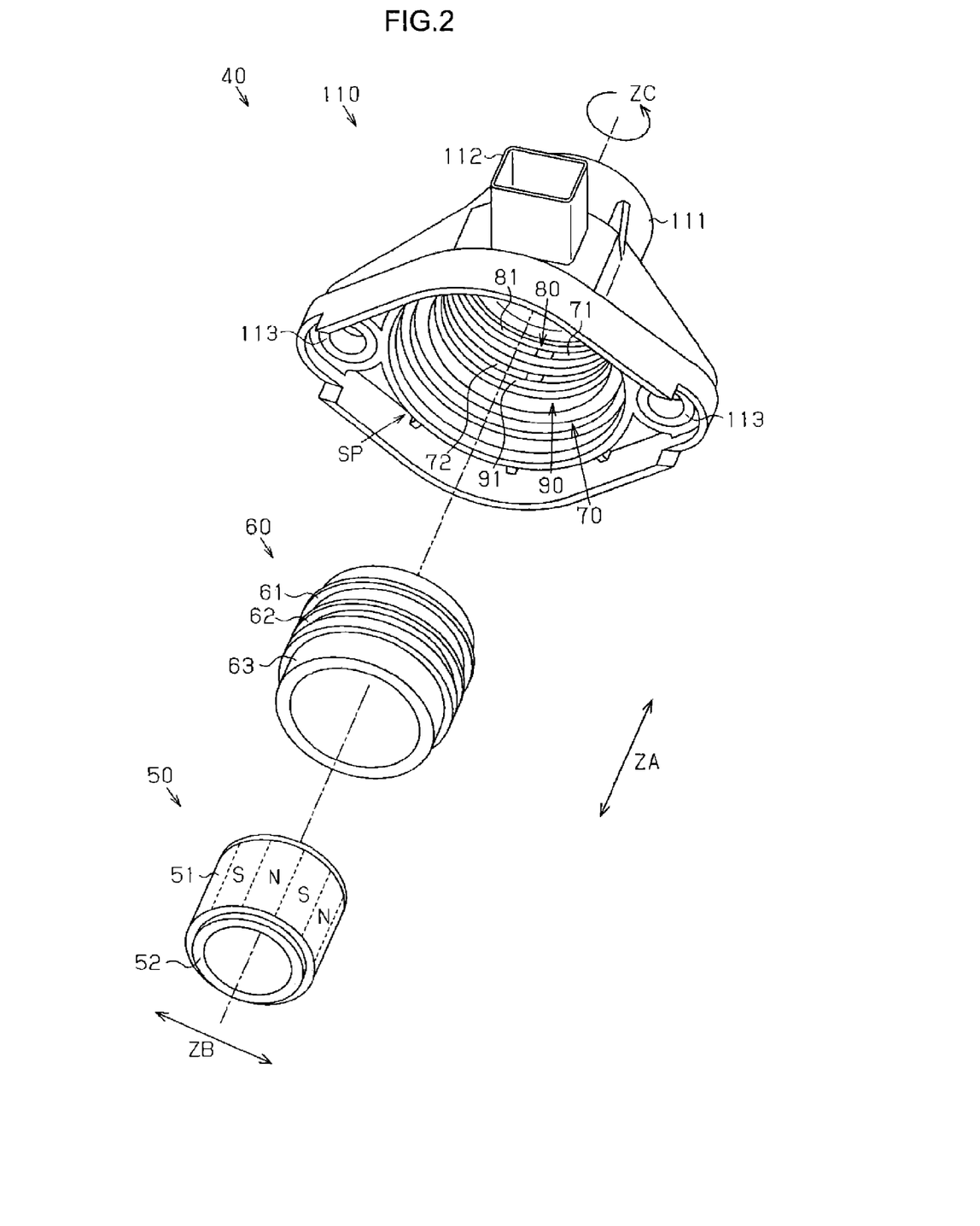
FIG. 2 is an exploded perspective view of a torque detecting device according to the embodiment.

The configuration of the torque detecting device 40 will be described in detail. The torque detecting device 40 includes a magnet unit 50, a magnetic yoke unit 60, a sensor unit 70, and an external housing 110 that are shown in FIG. 2, an oil seal that is a seal member 41 shown in FIG. 3, and an O-ring that is a seal member 42 shown in FIG. 3.

Figure 3:
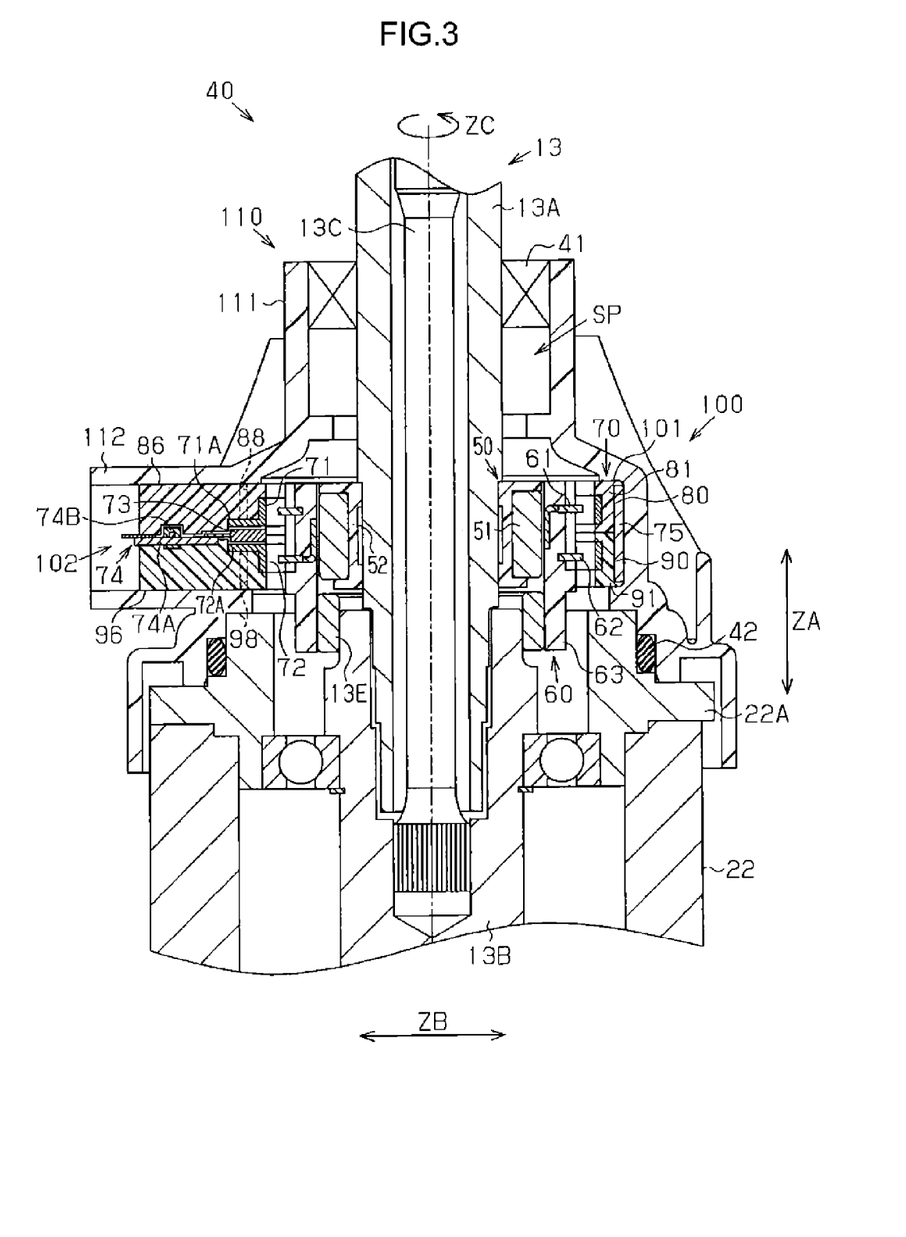
FIG. 3 is a longitudinal sectional view of the torque detecting device according to the embodiment.

As shown in FIG. 3, the seal member 41 is disposed between the external housing 110 of the torque detecting device 40 and the pinion shaft 13. The seal member 41 is fitted to the external housing 110. The seal member 42 is disposed between the external housing 110 and the fitting member 22A.

The configuration of the magnet unit 50 will be described. As shown in FIG. 2, the magnet unit 50 has a cylindrical shape. As shown in FIG. 3, the magnet unit 50 is disposed coaxially with the pinion shaft 13. The magnet unit 50 includes a permanent magnet 51 and a fixing member 52. The permanent magnet 51 is a multi-polar magnet with magnetic poles disposed in a circumferential direction ZC. The fixing member 52 is formed of a resin material. The fixing member 52 is fixed to an outer circumferential surface of the input shaft 13A. The permanent magnet 51 is fixed to an outer circumferential surface of the fixing member 52.

The configuration of the magnetic yoke unit 60 will be described. As shown in FIG. 2, the magnetic yoke unit 60 has a cylindrical shape. As shown in FIG. 3, the magnetic yoke unit 60 is fixed to the fixing member 13E (refer to FIG. 3). The magnetic yoke unit 60 is disposed coaxially with the pinion shaft 13. The magnetic yoke unit 60 is disposed around the magnet unit 50. The magnetic yoke unit 60 and the magnet unit 50 are disposed with a gap therebetween in a radial direction ZB.

As shown in FIG. 2, the magnetic yoke unit 60 includes a first magnetic yoke 61, a second magnetic yoke 62, and a yoke holder 63. The yoke holder 63 has a cylindrical shape. The yoke holder 63 is integrated with the first magnetic yoke 61 and the second magnetic yoke 62.

As shown in FIG. 3, the first magnetic yoke 61 and the second magnetic yoke 62 are disposed around the permanent magnet 51 at positions in a magnetic field formed by the permanent magnet 51. Each of the first magnetic yoke 61 and the second magnetic yoke 62 is formed of a metal material that is a soft magnetic material. Each of the first magnetic yoke 61 and the second magnetic yoke 62 has a plurality of lug portions (not shown). An example of the specific configuration of the first magnetic yoke 61 and the second magnetic yoke 62 is described in, for example, Japanese Patent Application Publication No. 2009-192248 (JP 2009-192248 A).

The configuration of the sensor unit 70 will be described. As shown in FIG. 2, the sensor unit 70 is integrated with the external housing 110. As shown in FIG. 3, the sensor unit 70 is disposed coaxially with the pinion shaft 13. The sensor unit 70 is disposed around the magnetic yoke unit 60. The sensor unit 70 and the magnetic yoke unit 60 are disposed with a gap therebetween in the radial direction ZB.

Figure 5:
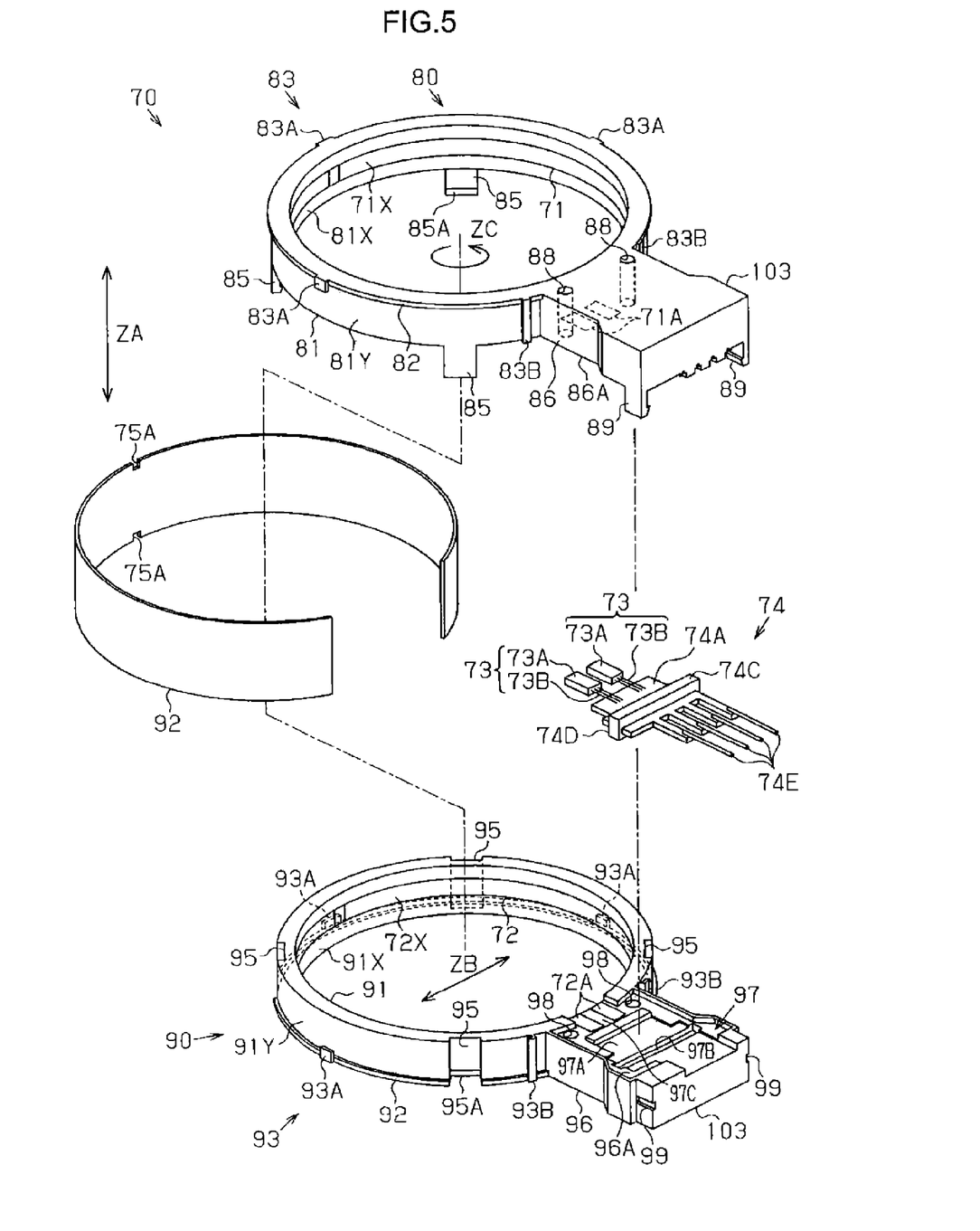
FIG. 5 is an exploded perspective view of the sensor unit of the torque detecting device according to the embodiment.

As shown in FIG. 3, the sensor unit 70 includes a first magnetism collecting ring 71, a second magnetism collecting ring 72, two magnetic elements 73, and a terminal 74. As shown in FIG. 5, the two magnetic elements 73 are electrically connected to the terminal 74. An external connector (not shown) that is electrically connected to the control device 35 (refer to FIG. 1) is connected to the terminal 74.

The first magnetism collecting ring 71 is formed of a metal material that is a soft magnetic material. The first magnetism collecting ring 71 has a C-shape. The first magnetism collecting ring 71 is disposed coaxially with the pinion shaft 13. The first magnetism collecting ring 71 has two element facing portions 71A. The second magnetism collecting ring 72 has the same configuration as that of the first magnetism collecting ring 71.

The first magnetism collecting ring 71 is disposed around the first magnetic yoke 61. The second magnetism collecting ring 72 is disposed around the second magnetic yoke 62. The first magnetism collecting ring 71 and the second magnetism collecting ring 72 are disposed with a gap therebetween in an axial direction ZA. The element facing portions 71A and element facing portions 72A form a gap therebetween in the axial direction ZA.

The magnetic elements 73 are Hall ICs. One of the magnetic elements 73 is disposed between one of the element facing portions 71A and one of the element facing portions 72A. The other magnetic element 73 is disposed between the other element facing portion 71A and the other element facing portion 72A. Each of the magnetic elements 73 has an element main body 73A and three pins 73B (refer to FIG. 5). The element main body 73A has a magneto-sensitive portion (not shown) that detects magnetic flux. Each of the magnetic elements 73 outputs a signal according to the magnetic flux density between the element facing portions 71A, 72A, to the control device 35 (refer to FIG. 1). The sensor unit 70 detects the magnetic flux density between the element facing portions 71A, 72A by using a principle according to the principle described in, for example, JP 2009-192248 A.

As shown in FIG. 5, the terminal 74 has a substrate 74A, a capacitor 74B (refer to FIG. 10), a cover 74C, a positioning portion 74D, and four connecting pins 74E. The pins 73B of the magnetic elements 73 are connected to one end of the substrate 74A. The four connecting pins 74E are connected to the other end of the substrate 74A. The dotted part in FIG. 10 shows a molding resin of the external housing 110.

Figure 10:
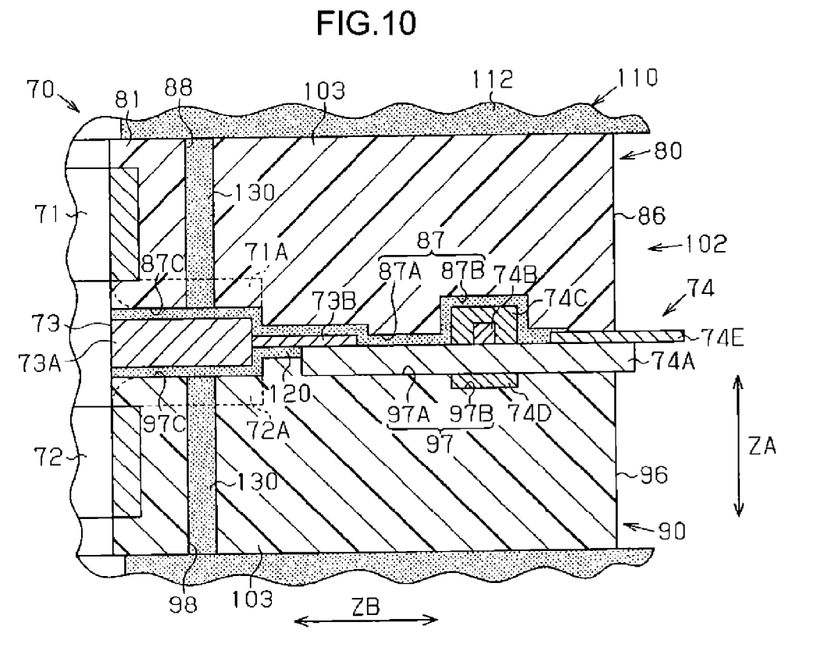
FIG. 10 is a sectional view of the torque detecting device according to the embodiment, the sectional view taken along a line Z4D-Z4D in FIG. 4.

As shown in FIG. 10, the capacitor 74B is fitted onto the substrate 74A. The capacitor 74B is electrically connected to the magnetic elements 73 and the connecting pins 74E. The capacitor 74B reduces the noise that is input into the magnetic elements 73.

The cover 74C is formed of a resin material. The cover 74C covers the capacitor 74B. The positioning portion 74D is formed of a resin material. The positioning portion 74D is formed on the surface of the substrate 74A, the surface being opposite to the surface of the substrate 74A on which the capacitor 74B is provided.

The configuration of the external housing 110 will be described. As shown in FIG. 3, the pinion shaft 13 is inserted into the external housing 110. The external housing 110 is formed of a resin material. The external housing 110 has a housing main body 111, a connection portion 112, and fitting portions 113 (refer to FIG. 2). The housing main body 111, the connection portion 112, and the fitting portions 113 are formed of the same resin material, and thus are integrated. The external housing 110 is fixed to the fitting member 22A of the rack housing 22 by using bolts (not shown) that are inserted into the fitting portion 113.

The housing main body 111 covers the sensor unit 70 from outside. An accommodating space SP is formed in the external housing 110. In the external housing 110, the magnet unit 50, the magnetic yoke unit 60, and the sensor unit 70 are accommodated in the accommodating space SP. The connection portion 112 protrudes from the housing main body 111 toward an outer side in the radial direction ZB. An external connector (not shown) is internally fitted to the connection portion 112.

Figure 4:
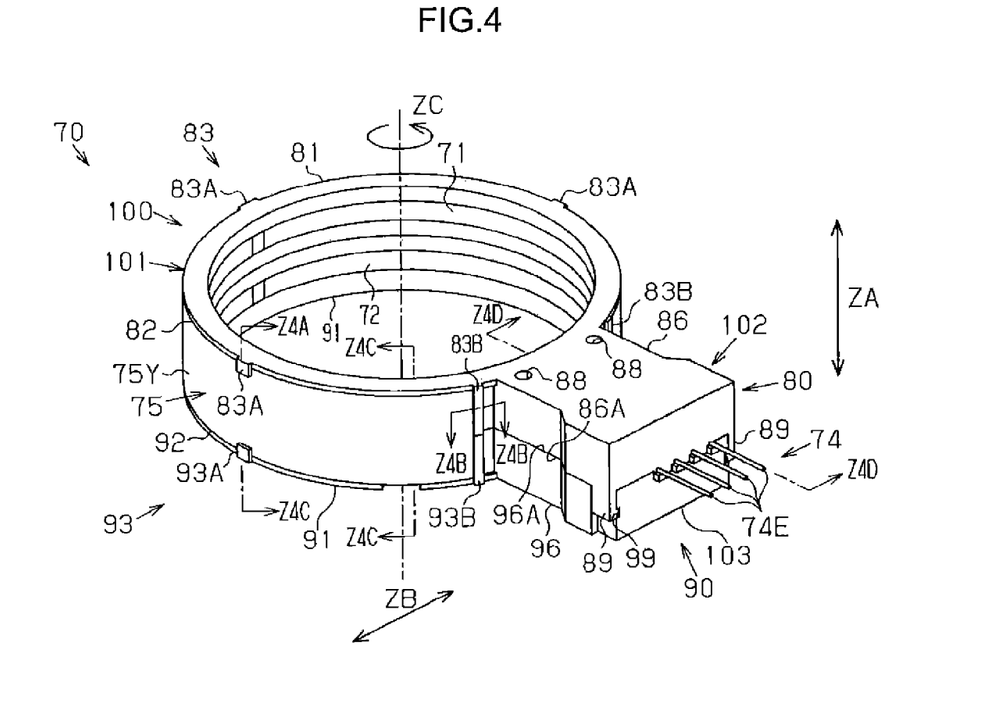
FIG. 4 is a perspective view of a sensor unit of the torque detecting device according to the embodiment.

The configuration of a main characteristic part of the present embodiment will be described with reference to FIGS. 4 to 10. FIG. 4 is a perspective view showing the structure of the sensor unit 70 (hereinafter, referred to as the single-body sensor unit 70) that is not integrated with the external housing 110. FIG. 5 is an exploded perspective view showing the single-body sensor unit 70. FIG. 10 shows the cross-sectional structure of the sensor unit 70 of the torque detecting device 40 that is completed. The configuration of the single-body sensor unit 70 will be described with reference to FIGS. 4, 5, 8A, 8B, and 10. The dotted part in FIG. 8A shows a magnetic shield 75.

As shown in FIG. 4, the sensor unit 70 includes the magnetic shield 75 and a sensor housing 100 in addition to the first magnetism collecting ring 71, the second magnetism collecting ring 72, the two magnetic elements 73, and the terminal 74.

The sensor housing 100 is formed of the same resin material as the resin material of which the external housing 110 is formed. The sensor housing 100 includes a magnetism collecting holder 101 and a case 102. The magnetism collecting holder 101 has a cylindrical shape. The magnetism collecting holder 101 is integrated with the first magnetism collecting ring 71 and the second magnetism collecting ring 72. The magnetism collecting holder 101 includes an upper holder 81 and a lower holder 91. The upper holder 81 and the lower holder 91 are combined with each other to constitute the magnetism collecting holder 101.

The case 102 has a substantially quadrangular shape in a plan view of the sensor housing 100. The case 102 is disposed on the side of the outer circumference of the magnetic yoke unit 60 (refer to FIG. 3) with a gap between the case 102 and the magnetic yoke unit 60. The case 102 extends from the outer circumference of the magnetism collecting holder 101 toward an outer side in the radial direction ZB. The case 102 has a wall portion 103. An internal space (not shown) that is surrounded by the wall portion 103 is formed in the case 102.

As shown in FIG. 10, the internal space of the case 102 is filled with an internal space filling portion 120 in the sensor unit 70 in a state where the external housing 110 is formed. The internal space filling portion 120 is present around the magnetic elements 73 and the terminal 74. In the single-body sensor unit 70, a part that corresponds to a part of the torque detecting device 40 in which the internal space filling portion 120 is present is present as an internal space.

As shown in FIG. 5, the case 102 accommodates the two magnetic elements 73 and the terminal 74. The case 102 includes an upper case 86 and a lower case 96. The upper case 86 and the lower case 96 are combined with each other to constitute the case 102.

The upper holder 81 and the upper case 86 are formed of the same resin material, and thus are integrated. The upper holder 81 and the upper case 86 constitute an upper sensor housing 80 that is one of the components constituting the sensor unit 70.

The upper holder 81 is integrated with the first magnetism collecting ring 71. An inner circumferential surface 81X of the upper holder 81 and an inner circumferential surface 71X of the first magnetism collecting ring 71 are flush with each other. The upper holder 81 has a shield supporting portion 82, a plurality of hook portions 83, a positioning portion 84 (refer to FIGS. 8A and 8B), and four engaging portions 85.

The shield supporting portion 82 extends toward an outer side in the radial direction ZB from an outer circumferential surface of an upper end portion of the upper holder 81. Three of the plurality of hook portions 83 are intermediate hook portions 83A that have a common function. Two of the plurality of hook portions 83 are end hook portions 83B that have a common function. The intermediate hook portions 83A extend in the axial direction ZA from an outer circumferential surface of the shield supporting portion 82. The end hook portions 83B are formed at positions adjacent to the upper case 86 in the circumferential direction ZC. The end hook portions 83l3 are formed to extend from an upper portion of the upper holder 81 to a lower portion of the upper holder 81. The end hook portions 83l3 have an L-shape in a bottom view of the upper sensor housing 80.

The engaging portions 85 are formed between the hook portions 83 adjacent in the circumferential direction ZC. The engaging portions 85 extend in the axial direction ZA from a lower end portion of the upper holder 81. Engaging protruding portions 85A are formed in distal end portions of the engaging portions 85.

Figure 8A:
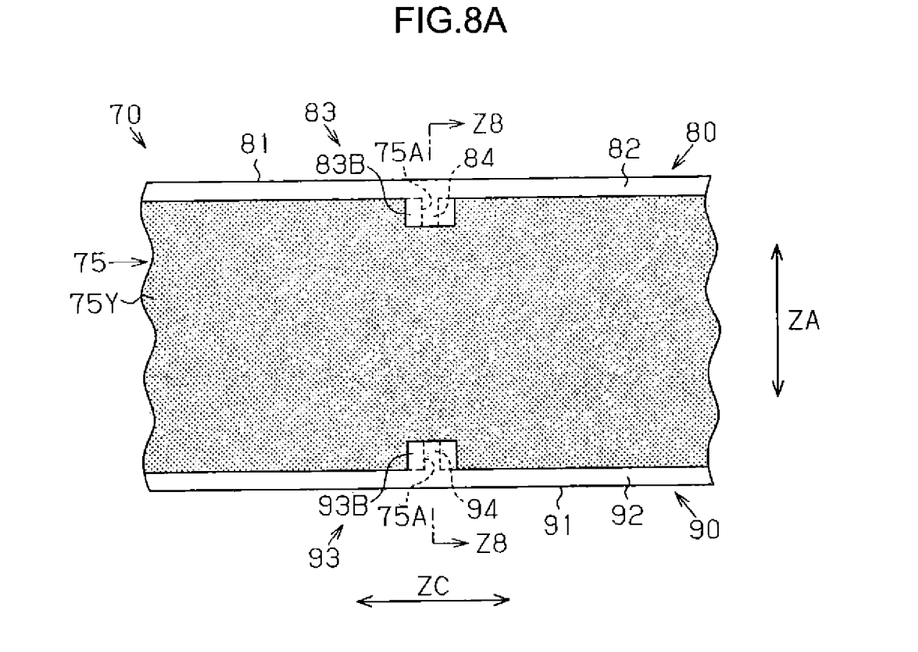
FIG. 8A is a side view of the sensor unit.
Figure 8B:
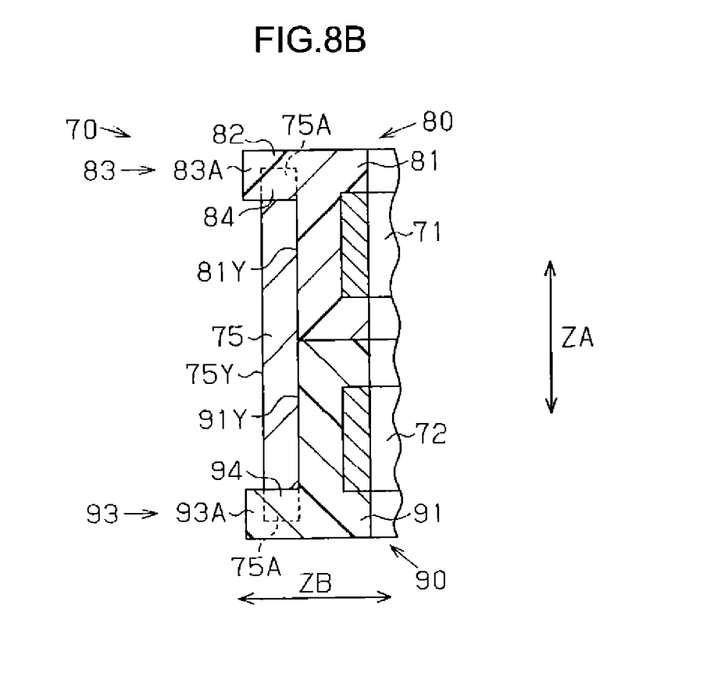
FIG. 8B is a sectional view taken along a line Z8-Z8 in FIG. 8A.

The positioning portion 84 is formed at a position that is approximately 180° apart from the upper case 86 in the circumferential direction ZC. As shown in FIG. 8B, the positioning portion 84 is formed integrally with the intermediate hook portion 83A. The positioning portion 84 extends in the axial direction ZA form a lower surface of the shield supporting portion 82.

As shown in FIG. 5, the upper case 86 has a recessed portion 87 (refer to FIG. 10), two communication paths 88, and two engaging portions 89. The engaging portions 89 are formed in a lower portion of a distal end portion of the upper case 86. The engaging portions 89 have the same configuration as the engaging portions 85 of the upper holder 81.

As shown in FIG. 10, the recessed portion 87 is formed to extend from a root part of the upper case 86 and the upper holder 81 to a distal end part of the upper case 86. The recessed portion 87 has a substrate holding portion 87A, a capacitor holding portion 87B, and an element arrangement portion 87C. The substrate holding portion 87A has a protruding shape. The capacitor holding portion 87B is recessed with respect to the substrate holding portion 87A. The element arrangement portion 87C is formed at a part inside the substrate holding portion 87A in the radial direction ZB in the recessed portion 87. The element facing portions 71A of the first magnetism collecting ring 71 are disposed in the element arrangement portion 87C.

As shown in FIG. 5, the two communication paths 88 are formed at positions adjacent to the element facing portions 71A in the circumferential direction ZC, and the two communication paths 88 and the element facing portions 71A are formed at the same position in the radial direction ZB. As shown in FIG. 10, the communication paths 88 extend through the part of the wall portion 103, in which the recessed portion 87 is formed, in the axial direction ZA.

As shown in FIG. 5, the lower holder 91 and the lower case 96 are formed of the same resin material, and thus are integrated. The lower holder 91 and the lower case 96 constitute a lower sensor housing 90 that is one of the components constituting the sensor unit 70.

The lower holder 91 is integrated with the second magnetism collecting ring 72. An inner circumferential surface 91X of the lower holder 91 and an inner circumferential surface 72X of the second magnetism collecting ring 72 are flush with each other. The lower holder 91 has a shield supporting portion 92, a plurality of hook portions 93, a positioning portion 94 (refer to FIGS. 8A and 8B), and four engaging portions 95.

Three of the plurality of hook portions 93 are intermediate hook portions 93A that have a common function. Two of the plurality of hook portions 93 are end hook portions 93B that have a common function. The intermediate hook portions 93A have the same configuration as that of the intermediate hook portions 83A. The intermediate hook portions 93A are formed at the same positions as the positions of the intermediate hook portions 83A in the circumferential direction ZC. The end hook portions 93B have the same configuration as that of the end hook portions 83B. The end hook portions 93B are formed at the same positions as the positions of the end hook portions 83B in the circumferential direction ZC.

As shown in FIGS. 8A and 8B, the positioning portion 94 has the same configuration as that of the positioning portion 84. The positioning portion 94 is formed at the same position as the position of the positioning portion 84 in the circumferential direction ZC. The shield supporting portion 92 has the same configuration as that of the shield supporting portion 82.

As shown in FIG. 5, the four engaging portions 95 are formed at the same positions as the positions of the four engaging portions 85 in the circumferential direction ZC. The engaging portions 95 are recessed from an outer circumferential surface 91Y of the lower holder 91 toward an inner side in the radial direction ZB. Engaging recessed portions 95A are formed in lower end portions of the engaging portions 95.

The lower case 96 has a recessed portion 97, two communication paths 98, and two engaging portions 99. The engaging portions 99 are formed in a distal end portion of the lower case 96 at positions on outer sides of the lower case 96. The engaging portions 99 have the same configuration as that of the engaging portions 95.

The recessed portion 97 is formed to extend from a root part of the lower case 96 and the lower holder 91 to a distal end part of the lower case 96. The recessed portion 97 has a substrate holding portion 97A, a positioning portion 97B, and an element arrangement portion 97C.

The substrate holding portion 97A has a recessed shape. The contour of the substrate holding portion 97A is substantially similar to the contour of the substrate 74A of the terminal 74. The positioning portion 97B is formed in a central portion of the substrate holding portion 97A in the radial direction ZB. The positioning portion 97B is recessed with respect to the substrate holding portion 97A. The dimension of the positioning portion 97B in the width direction of the lower case 96 is larger than the dimension of the substrate holding portion 97A in the width direction of the lower case 96. The element arrangement portion 97C is formed at a part inside the substrate holding portion 97A in the radial direction ZB, in the recessed portion 97. The element facing portions 72A of the second magnetism collecting ring 72 are disposed in the element arrangement portion 97C.

The two communication paths 98 are formed at positions adjacent to the element facing portions 72A in the circumferential direction ZC, and the two communication paths 98 and the element facing portions 72A are formed at the same position in the radial direction ZB. As shown in FIG. 10, the communication paths 98 extend through the part of the wall portion 103, in which the recessed portion 97 is formed, in the axial direction ZA.

As shown in FIG. 5, the magnetic shield 75 is formed by bending one sheet of a magnetic material, which is a long metal plate. The magnetic shield 75 has a C-shape. Two positioning portions 75A are formed in a central portion of the magnetic shield 75 in the circumferential direction ZC. The positioning portions 75A are formed in end portions of the magnetic shield 75 in the axial direction ZA. Each of the positioning portions 75A has a shape obtained by cutting out a portion of the magnetic shield 75 from an end face of the magnetic shield 75 in the axial direction ZA toward an intermediate portion in the axial direction ZA. The magnetic shield 75 reduces the effect of an external magnetic field on a magnetic circuit that is formed by the magnetism collecting rings 71, 72, the magnetic yokes 61, 62, and the permanent magnet 51 (refer to FIG. 3 for all of them).

The holding structure of the magnetic shield 75 will be described with reference to FIGS. 4 to 8B. As shown in FIG. 4, the magnetic shield 75 is fitted to an outer circumferential surface of the magnetism collecting holder 101. In other words, as shown in FIG. 5, the magnetic shield 75 is fitted to an outer circumferential surface 81Y of the upper holder 81 and the outer circumferential surface 91Y of the lower holder 91. The magnetic shield 75 is sandwiched between the shield supporting portion 82 of the upper holder 81 and the shield supporting portion 92 of the lower holder 91 in the axial direction ZA. An outer circumferential surface 75Y of the intermediate portion that is a part between both of end portions of the magnetic shield 75 faces the three intermediate hook portions 83A of the upper holder 81 and the three intermediate hook portions 93A of the lower holder 91.

Figure 6:
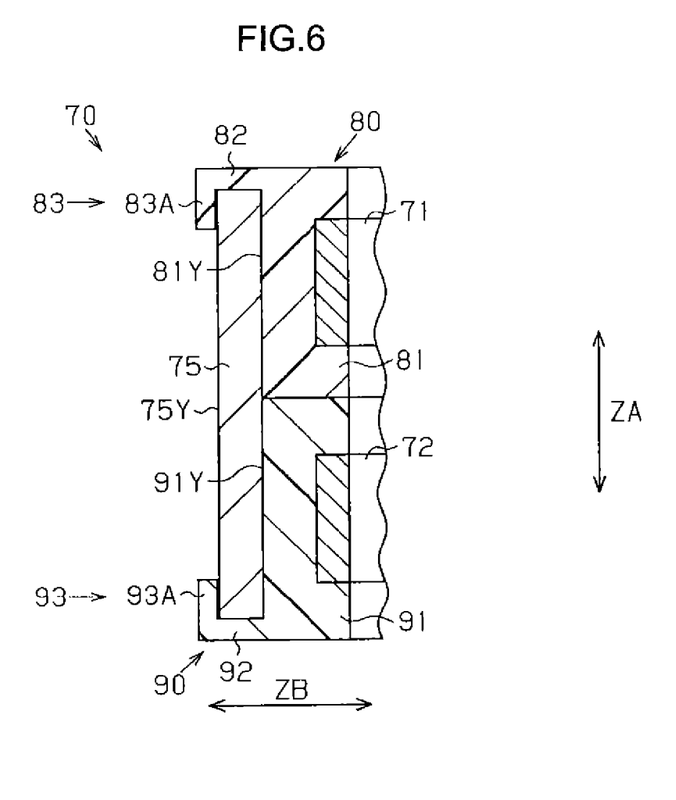
FIG. 6 is a sectional view taken along a line Z4A-Z4A in FIG. 4.

As shown in FIG. 6, an upper end portion of the intermediate portion of the magnetic shield 75 is sandwiched between the outer circumferential surface 81Y of the upper holder 81 and the intermediate hook portion 83A. A lower end portion of the intermediate portion of the magnetic shield 75 is sandwiched between the outer circumferential surface 91Y of the lower holder 91 and the intermediate hook portion 93A.

As shown in FIG. 4, both of the end portions of the magnetic shield 75 in the circumferential direction ZC are respectively inserted into the two end hook portions 83B of the upper holder 81, and are respectively inserted into the two end hook portions 93B of the lower holder 91.

Figure 7:
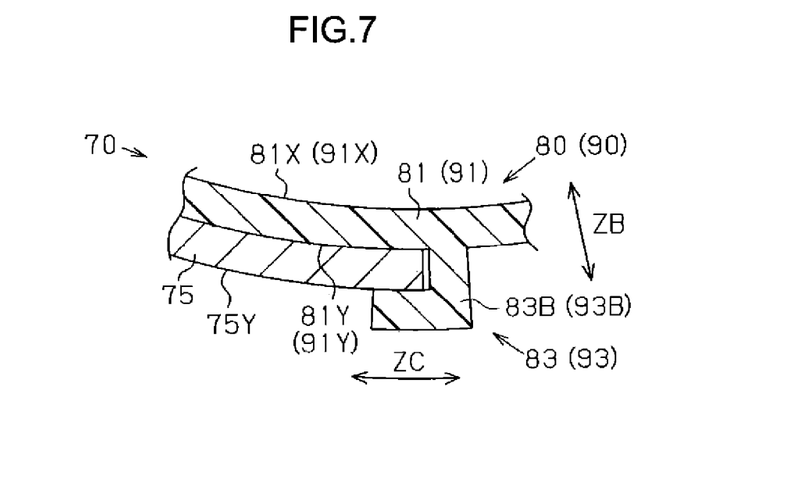
FIG. 7 is a sectional view taken along a line Z4B-Z4B in FIG. 4.

As shown in FIG. 7, an end face of the magnetic shield 75 in the circumferential direction ZC faces the end hook portion 83B and the end hook portion 93B with a gap between the end face and the end hook portions 83B, 93B. An upper portion of the end portion of the magnetic shield 75 in the circumferential direction ZC is sandwiched between the outer circumferential surface 81Y of the upper holder 81 and the end hook portion 83B. A lower portion of the end portion of the magnetic shield 75 in the circumferential direction ZC is sandwiched between the outer circumferential surface 91Y of the lower holder 91 and the end hook portion 93B.

As shown in FIGS. 8A and 8B, the positioning portion 75A on an upper side of the magnetic shield 75 is fitted to the positioning portion 84 of the upper holder 81. The positioning portion 75A on a lower side of the magnetic shield 75 is fitted to the positioning portion 94 of the lower holder 91.

Figure 9:
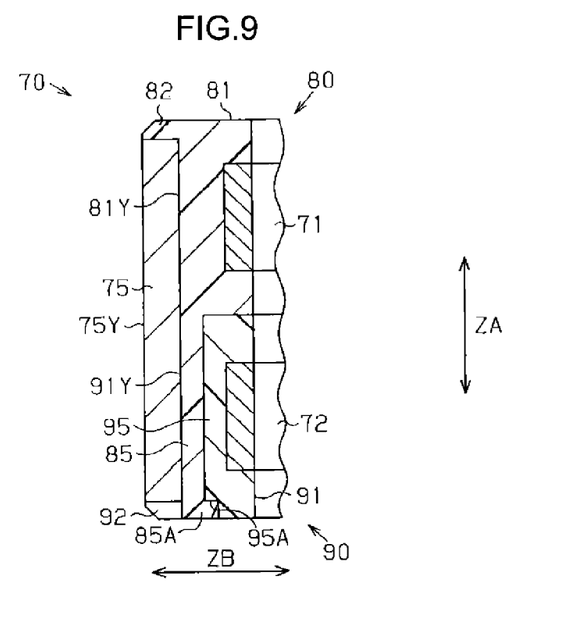
FIG. 9 is a sectional view taken along a line Z4C-Z4C in FIG. 4.

The engagement structure of the sensor housing 100 will be described with reference to FIGS. 4 and 9. As shown in FIG. 9, the engaging portion 85 of the upper holder 81 is formed inside the magnetic shield 75 in the radial direction ZB. The engaging protruding portions 85A of the engaging portions 85 are engaged with the engaging recessed portions 95A of the engaging portions 95.

As shown in FIG. 4, the engaging portions 89 of the upper case 86 and the engaging portions 99 of the lower case 96 are engaged with each other. The engagement structure of the engaging portions 89 and, the engaging portions 99 is similar to the engagement structure of the engaging portions 85 and the engaging portions 95. A lower surface 86A of a circumferential edge of the upper case 86 and an upper surface 96A of a circumferential edge of the lower case 96 are in contact with each other.

The accommodating structure of the case 102 will be described with reference to FIG. 10. The substrate 74A of the terminal 74 is sandwiched in the axial direction ZA between the substrate holding portion 87A of the upper case 86 and the substrate holding portion 97A of the lower case 96. The cover 74C of the terminal 74 is accommodated in the capacitor holding portion 87B of the upper case 86. The positioning portion 74D of the terminal 74 is fitted to the positioning portion 97B of the lower case 96. The magnetic elements 73 are sandwiched in the axial direction ZA between the element arrangement portion 87C of the upper case 86 and the element arrangement portion 97C of the lower case 96.

The covering structure of the external housing 110 will be described with reference to FIGS. 3 and 10. As shown in FIG. 3, the housing main body 111 of the external housing 110 covers the entire outer circumferences of the upper holder 81, the lower holder 91, and the magnetic shield 75. The housing main body 111 is in close contact with the entire outer circumferences of the upper holder 81, the lower holder 91, and the magnetic shield 75.

As shown in FIG. 10, the connection portion 112 of the external housing 110 covers the entire outer side of the case 102. The connection portion 112 is in close contact with the entire outer side of the case 102. In other words, the connection portion 112 is in close contact with the connection part between the lower surface 86A of the upper case 86 and the upper surface 96A of the lower case 96, and covers the connection part.

The internal space filling portion 120 and a communication path filling portion 130 are formed in the case 102. The internal space filling portion 120 and the communication path filling portion 130 are formed of the same resin material as the resin material of which the external housing 110 is formed.

The internal space filling portion 120 is integrated with the communication path filling portion 130. The internal space filling portion 120 fills the internal space that is formed in the case 102 of the single-body sensor unit 70. The internal space filling portion 120 covers the two magnetic elements 73 and the terminal 74, and is in close contact with the two magnetic elements 73 and the terminal 74.

The communication path filling portion 130 is integrated with the connection portion 112 of the external housing 110. The communication path filling portion 130 fills the communication paths 88, 98 that are formed in the case 102 of the single-body sensor unit 70.

A method of manufacturing the torque detecting device 40 will be described with reference to FIGS. 5 and 10. The method of manufacturing the torque detecting device 40 includes an assembly process for assembling the single-body sensor unit 70, a forming process for forming the external housing 110 for the single-body sensor unit 70, and a final process for assembling the torque detecting device 40 by using the sensor unit 70 that has been subjected to the forming process.

The assembly process will be described in detail with reference to FIG. 5. First, a coupled body constituted by the two magnetic elements 73 and the terminal 74 is placed in the recessed portion 97 of the lower case 96. At this time, the positioning portion 74D of the terminal 74 is inserted into the positioning portion 97B, and the substrate 74A of the terminal 74 is inserted into the substrate holding portion 97A. Thus, the magnetic elements 73 face the element facing portions 72A of the second magnetism collecting ring 72.

Then, the magnetic shield 75 is placed on the shield supporting portion 92 of the lower holder 91. At this time, the magnetic shield 75 is inserted between the outer circumferential surface 91Y and the hook portions 93 of the lower holder 91, and the positioning portion 75A on the lower side of the magnetic shield 75 is inserted into the positioning portion 94 of the lower holder 91. A procedure, in which the magnetic shield 75 is placed on the shield supporting portion 92 before the coupled body constituted by the two magnetic elements 73 and the terminal 74 is placed in the recessed portion 97, may be selected as the assembly process.

Then, the upper sensor housing 80 and the lower sensor housing 90 are engaged with each other, and the sensor housing 100 is assembled. At this time, the upper end portion of the magnetic shield 75 is inserted between the outer circumferential surface 81Y and the hook portions 83 of the upper holder 81, the positioning portion 84 of the upper holder 81 is fitted to the positioning portion 75A on the upper side of the magnetic shield 75, and the engaging portions 89 of the upper case 86 and the engaging portions 99 of the lower case 96 are engaged with each other.

When the sensor housing 100 is assembled, the recessed portion 97 of the lower case 96 and the recessed portion 87 of the upper case 86 form an internal space. The assembly constituted by the two magnetic elements 73 and the terminal 74 is held by the recessed portion 87 of the upper case 86 and the recessed portion 97 of the lower case 96 in the internal space.

Thus, the element facing portions 71A of the first magnetism collecting ring 71 face the magnetic elements 73 in the axial direction ZA.

The forming process will be described in detail with reference to FIG. 10. First, the single-body sensor unit 70 is disposed in a mold. Then, a molding material for the external housing 110 flows into the mold. At this time, the molding material flows into the internal space of the case 102 via the communication paths 88 of the upper case 86 and the communication paths 98 of the lower case 96. Accordingly, the communication paths 88, the communication paths 98, and the internal space are filled with the molding material and the magnetic elements 73 and the terminal 74 are covered by the molding material. After the internal space is filled with the molding material, the filling molding material is solidified, and thus, an assembly in which the sensor housing 100 and the external housing 110 are integrated is formed.

With the torque detecting device 40, the following advantageous effects can be achieved. The magnetic elements 73 are disposed in the case 102. An outer side surface of the case 102 is covered by the external housing 110. The connection portion 112 of the external housing 110 and the case 102 are in close contact with each other. With this configuration, water is unlikely to intrude into the case 102. Accordingly, water is unlikely to adhere to the magnetic elements 73. Thus, with the torque detecting device 40, adhesion of water to the magnetic elements 73 can be suppressed without using a seal member.

Since the case 102 holds the terminal 74, the positions of the magnetic elements 73 with respect to the element facing portions 71A, 72A are fixed. With this configuration, it is possible to omit a plurality of fixing screws that are used to determine the positions of element facing portions and magnetic elements, unlike in the conventional torque detecting device. Accordingly, the number of components can be decreased and the weight and costs can be reduced, as compared to the conventional torque detecting device.

The sensor unit 70 has the internal space filling portion 120. With to this configuration, intrusion of water into the case 102 can be further suppressed and adhesion of water to the magnetic elements 73 can be further suppressed.

The sensor unit 70 has the communication path filling portion 130. With this configuration, intrusion of water into the case 102 can be further suppressed and adhesion of water to the magnetic elements 73 can be further suppressed.

In the single-body sensor unit 70, the case 102 has the communication paths 88 and the internal space. With this configuration, the molding resin flows into the internal space via the communication paths 88 during the forming process for forming the external housing 110. Accordingly, the difference between the pressure that is applied to the case 102 by the molding resin outside the case 102 and the pressure that is applied to the case 102 by the molding resin flowing into the internal space is unlikely to increase. Accordingly, the case 102 is unlikely to be deformed during the forming process for forming the external housing 110. Accordingly, a situation in which the case 102 is pressed against the element main bodies 73A due to deformation of the case 102 is unlikely to occur. Accordingly, a decline in the function of the magnetic elements 73 can be suppressed. Effects similar to the effects described above can be achieved also by the relationship between the communication paths 98 and the internal space in the single-body sensor unit 70.

In the single-body sensor unit 70, the communication paths 88 allow the outside of the case 102 and the inside of the element arrangement portion 87C to communicate with each other. With this configuration, the molding resin flows rapidly around the element main bodies 73A during the forming process for forming the external housing 110. Accordingly, the difference between the pressure that is applied to the case 102 by the molding resin outside the case 102 and the pressure that is applied to the case 102 by the molding resin around the element main bodies 73A is unlikely to increase. Accordingly, the situation in which the case 102 is pressed against the element main bodies 73A due to deformation of the case 102 is even more unlikely to occur. Effects similar to the effects described above can be achieved also by the relationship between the communication paths 98 and the internal space in the single-body sensor unit 70.

In the single-body sensor unit 70, the terminal 74 is fixed to the case 102. With this configuration, the positions of the magnetic elements 73 with respect to the magnetism collecting rings 71, 72 are unlikely to be shifted during the forming process for forming the external housing 110.

The upper sensor housing 80 and the lower sensor housing 90 are fixed to each other. With this configuration, the shifting of the relative positions of the upper sensor housing 80 and the lower sensor housing 90 is suppressed during the manufacturing process for the torque detecting device 40.

The magnetic shield 75 is sandwiched between the outer circumferential surface 81Y and the hook portions 83 of the magnetism collecting holder 101. With this configuration, the magnetic shield 75 is unlikely to be separated from the outer circumferential surface 81Y of the magnetism collecting holder 101 in the single-body sensor unit 70. Accordingly, it is possible to suppress occurrence of a situation in which the molding resin flows into a part between the outer circumferential surface 81Y of the magnetism collecting holder 101 and the magnetic shield 75 during the forming process for forming the external housing 110. Accordingly, deformation of the magnetic shield 75 due to the molding resin for the external housing 110 is unlikely to occur. Effects similar to the effects described above can be achieved also by the relationship between the outer circumferential surface 91Y and the hook portions 93 of the magnetism collecting holder 101.

The position of the magnetic shield 75 in the circumferential direction ZC with respect to the magnetism collecting holder 101 is determined by the positioning portions 75A of the magnetic shield 75 and the positioning portions 84, 94 of the magnetism collecting holder 101. With this configuration, it is possible to suppress occurrence of a situation in which the position of the magnetic shield 75 varies among products of torque detecting device 40.

The entire end portions of the magnetic shield 75 in the circumferential direction ZC are covered by the end hook portions 83B, 93B. With this configuration, the molding material is unlikely to flow into a part between each of the end portions of the magnetic shield 75 in the circumferential direction ZC and the outer circumferential surfaces 81Y, 91Y of the magnetism collecting holder 101 during the forming process for forming the external housing 110.

The electric power steering system and the torque detecting device may be implemented in embodiments other than the embodiment described above. Hereinafter, modified examples of the embodiment described above, which correspond to the other embodiments of the electric power steering system and the torque detecting device, will be described. The modified examples described below can be combined with each other within the scope of technical feasibility.

The number of the intermediate hook portions 83A can be changed to one, two, or four or more. The number of the intermediate hook portions 93A of the lower holder 91 can also be changed in a similar manner.

The communication paths 88, 98 can be formed at positions other than those in the embodiment described above, as long as the communication paths 88, 98 are located in a range in which the communication paths 88, 98 communicate with the internal space in the single-body sensor unit 70. At least one of the plurality of hook portions 83 can be omitted. The plurality of hook portions 93 can also be modified in a similar manner.

At least one of the plurality of end hook portions 83B can be omitted. The plurality of end hook portions 93B can also be modified in a similar manner. The plurality of hook portions 83 can be formed as components separate from the upper holder 81. The plurality of hook portions 93 can also be modified in a similar manner.

A plurality of the communication paths 88 can be formed. The number of the communication paths 98 can also be changed in a similar manner. At least one of the communication path 88 and the communication path 98 can be omitted. In a case where both of the communication path 88 and the communication path 98 are omitted, the molding material does not flow into the internal space of the case 102 during the forming process for forming the external housing 110. Accordingly, the internal space of the case 102 is present as a space, without being filled with the molding material, in the completed torque detecting device 40.

The first magnetism collecting ring 71 and the second magnetism collecting ring 72 can be omitted. In a case where each of the magnetism collecting rings 71, 72 is omitted, the magnetism collecting holder 101 is also omitted. In this case, the case 102 that accommodates the magnetic elements 73 and the terminal 74 is formed integrally with the connection portion 112 of the external housing 110. The magnetic elements 73 detect the magnetic flux density between the first magnetic yoke 61 and the second magnetic yoke 62.

The first magnetism collecting ring 71 can be fitted to the upper sensor housing 80 after the upper sensor housing 80 is formed separately from the first magnetism collecting ring 71. The lower sensor housing 90 and the second magnetism collecting ring 72 can also be combined through a similar procedure.

The magnetism collecting holder 101 and the case 102 can be formed as separate components. The torque detecting device 40 can be fitted to a part other than the fitting member 22A of the rack housing 22.

The electric power steering system 1 can be modified to a rack assist type electric power steering system or a column assist type electric power steering system.

What is claimed is:

1. A torque detecting device comprising:
   a permanent magnet that is a multi-polar magnet with a cylindrical shape in which magnetic poles are disposed in a circumferential direction;
   a magnetic yoke that is formed of a magnetic material and is disposed around the permanent magnet at a position in a magnetic field formed by the permanent magnet, and that rotates with respect to the permanent magnet so that a relative phase of the magnetic yoke with respect to the permanent magnet changes;
   a magnetic element that is disposed around the magnetic yoke, and outputs a signal according to the magnetic field formed by the permanent magnet and magnetic flux of a magnetic circuit including the magnetic yoke;
   a terminal that is electrically connected to the magnetic element;
   a case that is disposed around the magnetic yoke, and accommodates the magnetic element and the terminal; and
   an external housing that is formed of a resin material, accommodates the permanent magnet and the magnetic yoke, covers an outer side surface of the case, and is formed integrally with the case.

2. The torque detecting device according to claim 1, further comprising:
   a communication path filling portion that is formed of a same resin material as the resin material of which the external housing is formed, the communication path filling portion being integrated with the external housing, and being present in a wall portion of the case; and
   an internal space filling portion that is formed of the same resin material as the resin material of which the external housing is formed, the internal space filling portion being integrated with the communication path filling portion, and being present around the magnetic element and the terminal in the case,
   wherein the communication path filling portion fills a communication path that is formed in the wall portion of the case, the communication path extending through the wall portion of the case, and
   wherein the internal space filling portion fills an internal space that is formed in the case, the internal space communicating with the communication path and accommodating the magnetic element and the terminal.

3. The torque detecting device according to claim 1, further comprising
   a magnetism collecting ring formed of a magnetic material, accommodated in the external housing, disposed around the magnetic yoke, and fixed to the external housing, the magnetism collecting ring allowing magnetic flux of the magnetic yoke to flow,
   wherein the case and the magnetic element are disposed around the magnetism collecting ring, and
   wherein the magnetism collecting ring includes an element facing portion that is disposed in the case and faces the magnetic element.

4. The torque detecting device according to claim 3, further comprising
   a magnetism collecting holder accommodated in the external housing, disposed around the magnetic yoke, fixed to the external housing, and integrated with the magnetism collecting ring,
   wherein the case and the magnetic element are disposed around the magnetism collecting holder.

5. The torque detecting device according to claim 4,
   wherein the case is constituted by an upper case and a lower case that are separately formed and are combined with each other,
   wherein the magnetism collecting holder is constituted by an upper holder and a lower holder that are separately formed and are combined with each other,
   wherein the upper case and the upper holder are formed of a same resin material and are integrated with each other, and
   wherein the lower case and the lower holder are formed of a same resin material and are integrated with each other.

6. The torque detecting device according to claim 4, further comprising
   a magnetic shield that is fitted to an outer circumferential surface of the magnetism collecting holder, and is in close contact with the external housing,
   wherein the magnetism collecting holder includes a hook portion that is formed to protrude from the outer circumferential surface of the magnetism collecting holder, and wherein the magnetic shield is sandwiched between the outer circumferential surface and the hook portion of the magnetism collecting holder.

7. An electric power steering system comprising the torque detecting device according to claim 1.

8. An electric power steering system comprising the torque detecting device according to claim 2.

9. An electric power steering system comprising the torque detecting device according to claim 3.

10. An electric power steering system comprising the torque detecting device according to claim 4.

11. An electric power steering system comprising the torque detecting device according to claim 5.

12. An electric power steering system comprising the torque detecting device according to claim 6.

* * * * *